United States Patent
Periyasamy et al.

(10) Patent No.: US 9,485,472 B2
(45) Date of Patent: Nov. 1, 2016

(54) SYSTEM AND METHOD FOR ENHANCED PRIVACY, RESOURCE AND ALERT MANAGEMENT

(71) Applicant: Honeywell International Inc., Morristown, NJ (US)

(72) Inventors: Kathiresan Periyasamy, Karnataka (IN); Gopalakrishna N, Karnataka (IN); Fabin Rodrigues, Karnataka (IN); Suhasini Kuruba, Karnataka (IN); Kaja Mohaideen, Tamilnadu (IN); Raja Prabhu, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 356 days.

(21) Appl. No.: 13/892,602

(22) Filed: May 13, 2013

(65) Prior Publication Data

US 2014/0333772 A1   Nov. 13, 2014

(51) Int. Cl.
*G08B 1/08* (2006.01)
*H04N 7/18* (2006.01)
*G08B 13/196* (2006.01)

(52) U.S. Cl.
CPC .......... *H04N 7/18* (2013.01); *G08B 13/19689* (2013.01); *G08B 13/19686* (2013.01)

(58) Field of Classification Search
CPC ......... G08B 13/00; G08B 21/22; H04N 7/18
USPC .............. 340/539.1, 539.14, 539.16–539.19, 340/539.25, 541, 545.1; 348/152–155
See application file for complete search history.

(56) References Cited

U.S. PATENT DOCUMENTS

| | | | |
|---|---|---|---|
| 6,658,091 B1 * | 12/2003 | Naidoo et al. | 379/37 |
| 6,661,340 B1 * | 12/2003 | Saylor et al. | 340/517 |
| 6,873,261 B2 * | 3/2005 | Anthony | B60R 25/102 340/426.1 |
| 7,113,090 B1 * | 9/2006 | Saylor et al. | 340/539.18 |
| 7,262,690 B2 * | 8/2007 | Heaton et al. | 340/500 |
| 8,375,118 B2 * | 2/2013 | Hao et al. | 709/223 |
| 8,473,619 B2 * | 6/2013 | Baum | G08B 25/14 706/46 |
| 8,520,072 B1 * | 8/2013 | Slavin et al. | 348/156 |
| 8,675,071 B1 * | 3/2014 | Slavin et al. | 348/156 |
| 8,786,434 B2 * | 7/2014 | Sennett | G08B 13/19682 340/5.1 |
| 8,897,375 B2 * | 11/2014 | Fraley | H04N 5/23203 375/240.25 |

(Continued)

*Primary Examiner* — Eric M Blount
(74) *Attorney, Agent, or Firm* — Wood, Phillips, Katz, Clark & Mortimer

(57) ABSTRACT

A home monitoring system comprises a control apparatus adapted to provide enhanced privacy, resource management and alert management. The control apparatus includes a camera for capturing video at the home. A memory stores captured video. A communication interface is operatively connected to the control apparatus for streaming video and receiving control commands. A central system is remotely located relative to the control apparatus and in operative communication with the communication interface for receiving and storing captured video from the control apparatus. A remote unit is remotely located relative to the control apparatus and in operative communication with the communication interface for generating control commands to the control apparatus to terminate transmission of video to the central system.

17 Claims, 4 Drawing Sheets

(56) References Cited

U.S. PATENT DOCUMENTS

| | | | |
|---|---|---|---|
| 8,937,658 B2* | 1/2015 | Hicks, III | G08B 13/19656 340/539.25 |
| 9,208,666 B2* | 12/2015 | Jackson | |
| 2004/0086089 A1* | 5/2004 | Naidoo | G08B 13/19669 379/37 |
| 2004/0155757 A1* | 8/2004 | Litwin, Jr. | H04L 12/2602 340/538 |
| 2006/0276200 A1* | 12/2006 | Radhakrishnan | H04L 63/302 455/456.1 |
| 2007/0009104 A1* | 1/2007 | Renkis | 380/270 |
| 2007/0262857 A1* | 11/2007 | Jackson | G08B 13/19656 340/506 |
| 2007/0298772 A1* | 12/2007 | Owens et al. | 455/414.1 |
| 2008/0284580 A1* | 11/2008 | Babich | G08B 13/19684 340/502 |
| 2009/0243852 A1* | 10/2009 | Haupt et al. | 340/541 |
| 2009/0261943 A1* | 10/2009 | Jana et al. | 340/3.1 |
| 2011/0090334 A1* | 4/2011 | Hicks et al. | 348/143 |
| 2013/0033379 A1* | 2/2013 | Jentoft | 340/541 |
| 2014/0232861 A1* | 8/2014 | Naidoo | H04N 7/18 348/143 |

* cited by examiner

SYSTEM AND METHOD FOR ENHANCED PRIVACY, RESOURCE AND ALERT MANAGEMENT

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

This application relates generally to home monitoring systems and, more particularly, to a method and apparatus for enhancing privacy, resource management and alert management.

BACKGROUND

Home security and monitoring systems have become commonplace as people seek to protect themselves and their property. Home security systems typically employ sensors at entry points, such as windows and doors, along with interior sensors such as motion detectors and glass break detectors. In connected home life style applications the monitoring systems typically employ cameras and the like to monitor real time activity in the home or to view past activity in the home.

In some localities the need for remote video monitoring has become a basic need as the number of incidents of theft, fire and personal harm increases drastically each year. At the same time, there are limitations in existing systems which lead to inadequate personal privacy, inadequate alert systems and wastage of resources.

In connected home life style video monitoring, it is important to provide privacy to the end customer. Particularly, the customer should be able to stop live streaming of video or stop recording. These types of options are generally not required for the video used for security or surveillance systems. However, it becomes essential in a lifestyle or connected home type of application where privacy is a major concern. With some home monitoring systems the cameras include a privacy button. If the privacy button is on, then the camera will not stream live video and will not record video. However, this feature is only available from the camera and with access to the push button. This requires the physical presence of the user to operate the button and that the camera be easily accessible. In either case, it will be difficult for the end user to manage the privacy function especially, when the user is away from home.

The establishment of a central monitoring system with access to emergency response teams, such as fire, police or medical, is not always reliable and may not exist in some areas. In those situations, it is the sole responsibility of the end user to monitor and take appropriate action in the event of an informed incident. This could entail informing neighbors, friends or an emergency response team situated close to the home. However, the problem with existing systems is that there is no flexibility in allowing the end user to alert others while the user is away from home.

In some instances, the end user accounts may be disabled or canceled because the customer is not paying a subscription fee or due to temporary disconnection. However, the video camera will continue to detect motion and stream video clips to a network operation center (NOC). As the number of such systems increase which are uploading video clips to the NOC, large amounts of network bandwidth and storage are utilized which increases the NOC operating cost. Also, for customers who have fixed broadband plans, the bandwidth will be exhausted quickly if the camera is unknowingly connected to the internet.

Other features and advantages will be apparent from a review of the entire specification, including the appended claims and drawings.

SUMMARY

As described herein, a home monitoring system according to one embodiment comprises a control apparatus for monitoring a home including a camera for capturing video at the home. A memory stores captured video. A communication interface is operably connected to the control apparatus for streaming video and receiving control commands. A central system is remotely located relative to the control apparatus and in operative communication with the communication interface for receiving and storing captured video from the control apparatus. A remote unit is remotely located relative to the control apparatus and in operative communication with the communication interface for generating control commands to the control apparatus to terminate transmission of video to the central system.

It is a feature that the remote unit may comprise a smart phone or a personal computer device.

It is another feature that the remote unit generates control commands to terminate transmission of stored video clips.

It is a further feature that the remote unit generates control commands to terminate live recording of video.

There is disclosed in accordance with another embodiment, a home monitoring system comprising a control apparatus for monitoring a home including a camera for capturing video at the home. A communication interface is operatively connected to the control apparatus for streaming video. A central monitoring system is remotely located relative to the control apparatus and in operative communication with the communication interface. A remote unit is in operative communication with the communication interface and the central system for receiving video from the control apparatus and generating control commands to the central system to alert third parties of emergency situations.

It is a feature that the central monitoring system in response to control commands transmits a message to the third parties.

It is another feature that the central monitoring system in response to control commands sends a control command to the control apparatus to sound an alarm horn.

It is yet another feature that the remote unit comprises a personal computing device.

There is disclosed in accordance with another embodiment, a home monitoring system comprising a control apparatus for monitoring a home including a camera for capturing video at the home and monitoring motion at the home. A communication interface is operatively connected to the control apparatus. A central system is remotely located relative to the control apparatus and in operative communication with the communication interface. The central system selectively commands a control apparatus to operate in plural modes including a normal mode wherein the captured video and a ping signal representing detected motion status is transmitted to the central system. A resource savings mode comprises the captured video not being transmitted to the central system and the ping signal representing detected motion status is transmitted to the central system.

It is a feature that the central system is configured to operate the resource savings mode for a specific time period.

It is another feature that the control apparatus includes a memory for storing video clips and the video clips are transmitted in the normal mode.

There is also disclosed herein a method of managing a home monitoring system, comprising: providing a control apparatus for monitoring a home including a camera for capturing video at the home, a memory for storing captured video and a communication interface operatively connected to the control; providing a central system remotely located relative to the control apparatus and in operative communication with the communication interface; providing a remote unit remotely located relative to the control apparatus and in operative communication with the communication interface; streaming captured video from the control apparatus to the central system and/or the remote unit; and the central system and/or the remote unit selectively commanding the control apparatus to terminate transmission of video.

Other features and advantages will be readily apparent from a review of the entire specification, including the appended claims and drawings.

DETAILED DESCRIPTION

Figure 1:
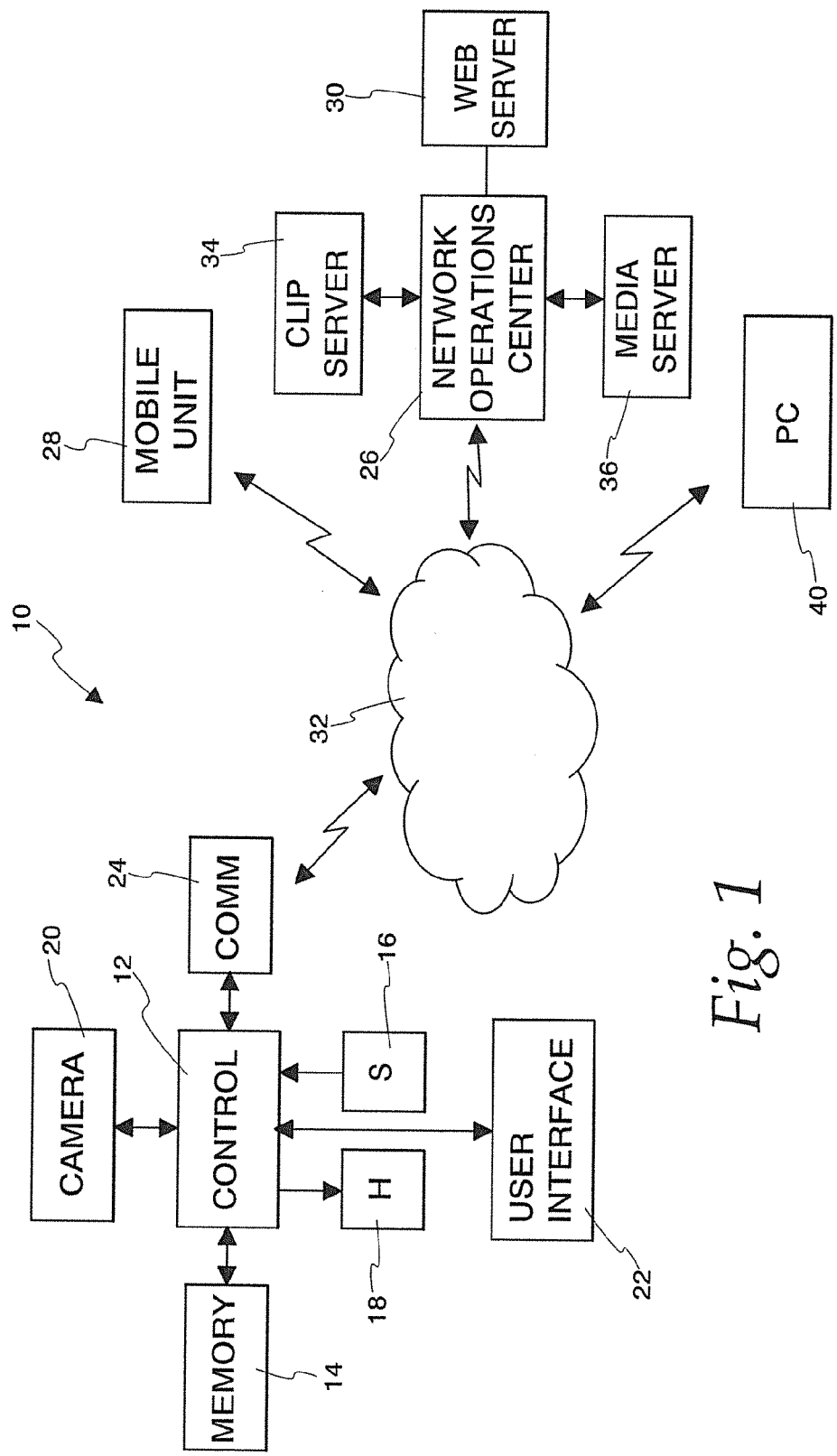
FIG. 1 is a block diagram of an exemplary home monitoring system.

FIG. 1 illustrates an overview of an exemplary monitoring system.

Many buildings such as homes and small businesses today are equipped with security systems to secure the buildings, e.g., by deterring burglaries and detecting fires or noxious fumes such as carbon monoxide. A typical security system includes a central control panel that communicates with a number of sensors via a wired or wireless path. For monitoring applications, the system may include a camera to provide for remote video monitoring.

Various components may communicate with the control panel. The control panel may also transmit signals to components of the monitoring system. For example, signals may be transmitted to a horn to activate the horn when an alarm condition is detected. Signals may be sent to a user interface device to display status information to the user, such as whether the system is armed or disarmed, whether a specific door or window has been opened, and, when the system is armed, whether an alarm has been tripped. The control panel may also have the ability to notify local emergency services and/or a remote monitoring station of an alarm condition via a telephone dialer or internet connection, if such services are available. Other communication paths such as long-range radio may also be used. The dialer is typically hardwired to the control panel and activated by the control.

Referring to FIG. 1, a home monitoring system 10 is illustrated in block diagram form. The monitoring system 10 includes a control 12. The control 12 is centrally located in the home or other building being monitored. The control 12 includes appropriate control apparatus such as a microprocessor that may execute software, firmware, or the like, to implement logic to locally control the monitoring system 10. The control 12 is operatively connected to a memory 14. The memory 14 may include volatile memory and/or non-volatile memory, as necessary, for storing software and data for operating the control 12. The control 12 may be connected to a plurality of wired sensors, one of which 16 is illustrated, and an alarm horn 18. The sensor 16 could be a door sensor, window sensor, motion sensor, or the like, as necessary for the particular security application. The control 12 is also connected to a camera 20 for transferring images to the control 12. Any of these connections could be wired or wireless.

The control 12 is operatively connected to a control panel 22 functioning as a user interface. The control 12 and user interface 22 may be connected by a wireless connection or a wired connection, as necessary or desired. The user interface 28 may include its own microprocessor and memory for implementing control functions or may simply be an I/O device relatively to the control 12.

For remote communications, the control 12 is connected to a communication interface 24. The communication interface 24 is adapted to provide status information to remote monitoring systems, such as a network operation center 26 or to other units such as a mobile unit 28 or a personal computing device (PC) 40. All of these communications are implemented via a network represented by a cloud 32. The communication network 32 may comprise any type of communication network. For example, the communication network 32 may utilize wired or wireless internet connections, telephone landline connections, a wireless cellular telephone network, or any combination thereof. The home monitoring application is not limited to any particular type of communication network 32.

The network operation center 26 may comprise a central monitoring station with which the user subscribes. This network operation center 26 may be used, for example, for alarm notification or remote video monitoring. In this regard, the network operation center 26 may be operatively associated with a web server 30, a media server 32 and/or a clip server 34. The media server 32 may receive live streaming video from the camera 20 for distribution to a mobile unit 28, such as via a cellular network, or to the web server 30 for access to live streaming through web applications. The clip server 34 is adapted to receive recorded video clips uploaded from the control 12, such as might be stored in the memory 14 or memory of the camera 20. In an alternative embodiment, the camera 20 may connect directly to the communication network 32 via a modem/router (not shown). Additionally, the live streaming video may be uploaded directly to the mobile unit 28 or the web server 30. The mobile unit 28 may comprise, for example, a mobile phone, smart phone, tablet computer, or the like. The web server 30 generally represents a web application accessible over the Internet by any type of personal computing device.

Figure 2:
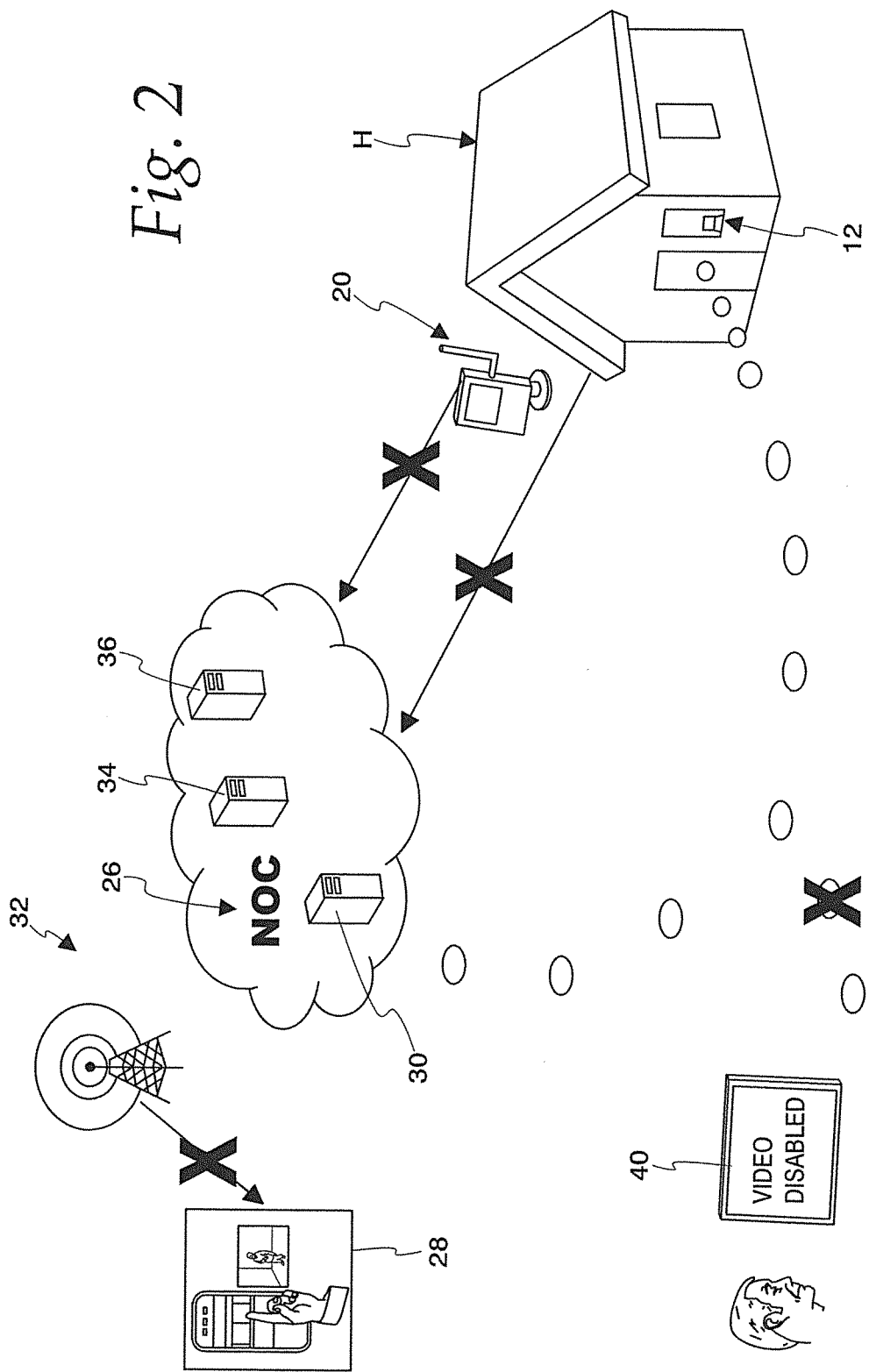
FIG. 2 is a process flow diagram illustrating use of the home monitoring system of FIG. 1 for privacy management.

FIG. 2 illustrates an application for the monitoring system 10 providing a solution for personal privacy. This enables the user to control privacy through a web app on the PC 40, or a mobile app using the mobile unit 28. If the user wants privacy, then the user can control the camera 20 remotely via the communications network 32 via web applications or mobile applications. This increases flexibility, comfort for the end user and most importantly personal privacy.

Particularly, the user of a mobile unit 28 can send a command via a cellular network, or WiFi, or the like, to the network operation center 26 which then sends a command to the control 12 located at a home H to terminate transmission of video. This command could be used to terminate live streaming from the camera 20 or to terminate uploading of recorded clips from the camera 20 or memory 14 to the clip server 34. The command could also be initiated by a web application via the PC 40. In either case, streaming video is then no longer available at the network operations center 26, or the mobile unit 28 or the PC 40.

Figure 3:
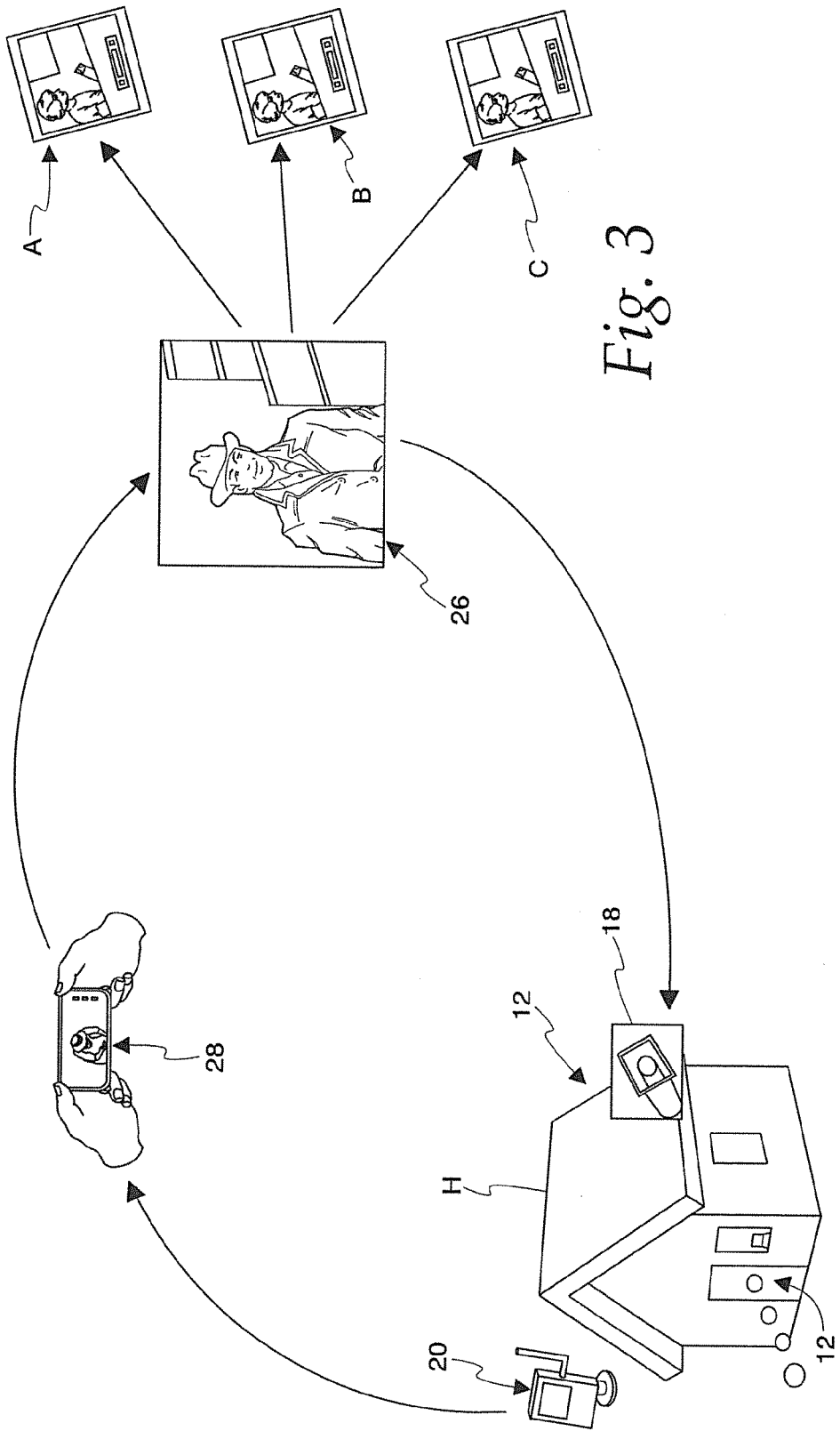
FIG. 3 is a process flow diagram illustrating use of the home monitoring system of FIG. 1 for alert management.

FIG. 3 illustrates use of the home monitoring system 10 to provide for enhanced alert management. In a typical application, the live video from the camera 20 is uploaded, through the control 12, directly or indirectly to the mobile unit 28. Likewise, the video could be uploaded to a web app, as discussed above. In the event that there is no automatic notification in view of an intrusion or the like, the user can monitor activity in the home with the live streaming video. The home monitoring system 10 is adapted to allow the user to quickly alert pre-identified neighbors, friends or emergency response teams from the mobile station 28 or web server 30 in the event of an emergency situation. This is done by the user sending a control command signal from the smart phone 28, or PC 40, to the network operation center 26 to alert third parties of emergency situations. In response to the control command, the network operation center 26 sends alerts to recipients A, B and/or C. These alerts may comprise an SMS message or an email message. Alternatively, the alert may be in the form of a pre-recorded voice message or a live voice call. In addition, the network operation center 26 may send a signal to the control 12 to sound the horn 18 to alert neighbors in proximity to the home.

The user has options to choose the appropriate level of response based on the situation. For example, if there is a medical emergency, then the user could use the mobile unit 28 to choose an emergency response team notification to a medical facility or emergency response team. If there is an intrusion, then the user might choose to send the alert to the police or to a neighbour and/or sound the horn 18. Any of these options would work if the user is in the home or away from the home, as by using the mobile unit 28 and/or the PC 40.

Figure 4:
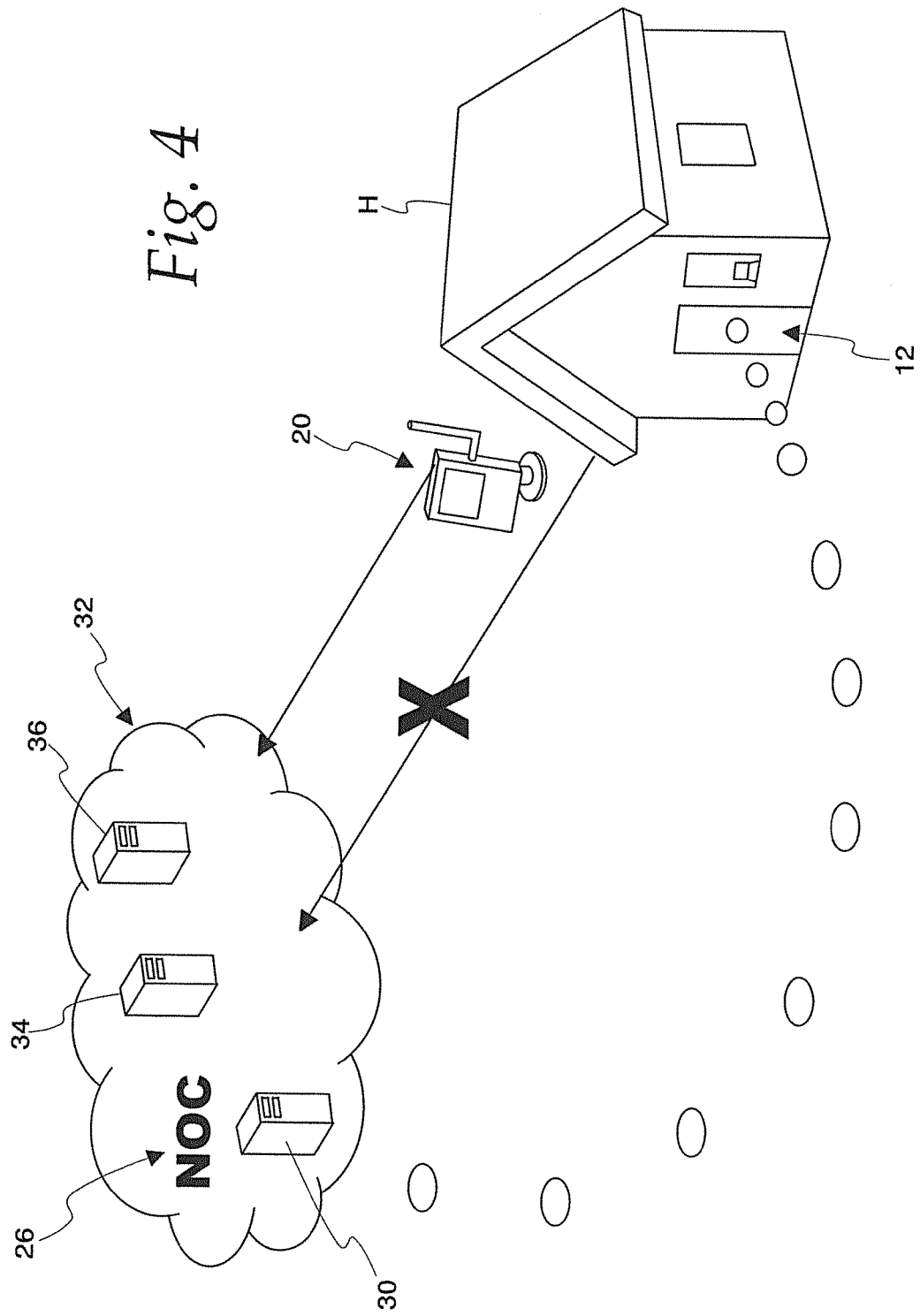
FIG. 4 is a process flow diagram illustrating use of the home monitoring system of FIG. 1 for resource management.

FIG. 4 illustrates configuration of the home monitoring system 10 for improved resource management to avoid wasting of resources. This is used to disable streaming of live video and video clips from the camera 20 or memory 14 to the clip server 34 and media server 36. Instead, only a ping request from the camera 20 is uploaded to the network operation center 26.

When a customer account is disabled or deleted from the network operation center 26, a command is sent to the control 12 so that video from the camera 20 is no longer streamed to the network operation center 26. This avoids unnecessary resources using the network operation center 26 and the control 12 when the account is either disabled temporarily or permanently. For example, the customer might choose for temporary disconnection of service for a specific period, such as three months, if the user is going to be away, or for any other reasons. This solution helps in saving recourse costs. Thus, the network operation center 26 selectively commands the control 12 to operate in a normal mode or a resource savings mode. In a normal mode, captured video and a ping signal representing detected motion status is transmitted to the network operation center 26. In the resource savings mode, the captured video is not transmitted to the network operation center 26. Instead, only the ping signal representing detected motion status is transmitted to the network operation center 26.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the process flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The present system and method have been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions. None of the methods according to various aspects disclosed herein is limited to performing the steps thereof in any particular order.

The invention claimed is:

1. A home monitoring system, comprising:
   a control apparatus for monitoring a home including a camera for capturing live video at the home, a memory for storing captured video clips and a communication interface operatively connected to the control apparatus for selectively streaming live video, uploading stored video clips and receiving control commands;
   a central system remotely located relative to the control apparatus and in operative communication with the communication interface for receiving and storing streaming live video and uploaded video clips from the control apparatus; and
   a remote unit remotely located relative to the control apparatus and in operative communication with the communication interface for generating privacy control commands to the control apparatus to terminate transmission of streaming live video or uploading of video clips to the central system,
   wherein the control apparatus responsive to receiving privacy control commands continues to capture live video and store captured video clips in the memory and terminates transmission of streaming live video or uploading of video clips to the central system.

2. The home monitoring system of claim 1 wherein the remote unit comprises a smartphone.

3. The home monitoring system of claim 1 wherein the remote unit comprises a personal computing device.

4. The home monitoring system of claim 1 wherein the remote unit generates privacy control commands to terminate transmission of streaming live video and uploading of video clips to the central system.

5. The home monitoring system of claim 1 wherein the remote unit generates privacy control commands to terminate storing of captured video clips.

6. A home monitoring system, comprising:
a control apparatus for monitoring a home including a camera for capturing video at the home and a communication interface operatively connected to the control apparatus for streaming video;
a central monitoring system remotely located relative to the control apparatus and in operative communication with the communication interface for receiving streaming video from the control apparatus; and
a remote unit remotely located relative to the control apparatus and in operative communication with the communication interface and the central system for receiving streaming video from the control apparatus and generating privacy control commands to the control apparatus to terminate transmission of streaming video to the central system and generating alert control commands to the central system to alert third parties of emergency situations,
wherein the control apparatus responsive to receiving privacy control commands continues to capture video and continues streaming video to the remote unit and terminates transmission of streaming video to the central system; and
wherein the central monitoring system in response to receiving alert control commands automatically transmits a message to a third party.

7. The home monitoring system of claim 6 wherein the central monitoring system in response to alert control commands transmits one of an SMS message an email message or a voice message to the third party.

8. The home monitoring system of claim 6 wherein the central monitoring system in response to control commands sends a control command to the control apparatus to sound an alarm horn.

9. The home monitoring system of claim 6 wherein the remote unit comprises a personal computing device.

10. A home monitoring system, comprising:
a control apparatus for monitoring a home including a camera for capturing video at the home and for generating a camera ping request representing detected motion status and a communication interface operatively connected to the control apparatus; and
a central system remotely located relative to the control apparatus and in operative communication with the communication interface,
wherein the central system selectively commands the control apparatus to operate in plural modes including a normal mode wherein the captured video and the camera ping signal are transmitted to the central system and a resource savings mode wherein the captured video is not transmitted to the central system and the camera ping signal is transmitted to the central system.

11. The home monitoring system of claim 10 wherein the central system is configurable to operate the resource savings mode for a specific time period.

12. The home monitoring system of claim 10 wherein the control apparatus includes a memory for storing video clips and the video clips are transmitted in the normal mode.

13. A method of managing a home monitoring system, comprising:
providing a control apparatus for monitoring a home including a camera for capturing live video at the home, a memory for storing captured video clips and a communication interface operatively connected to the control apparatus;
providing a central system remotely located relative to the control apparatus and in operative communication with the communication interface;
providing a remote unit remotely located relative to the control apparatus and in operative communication with the communication interface;
streaming live video and/or uploading captured video clips from the control apparatus to the central system and/or the remote unit; and
the central system and/or the remote unit selectively generating privacy commands for commanding the control apparatus to terminate transmission of streaming live video or uploading of captured video clips,
wherein the control apparatus responsive to receiving privacy commands continues to capture live video and store captured video clips in the memory and terminates transmission of streaming live video or uploading of video clips to the central system.

14. The method of managing a home monitoring system of claim 13 wherein the remote unit generates control commands to the central system to alert third parties of emergency situations.

15. The method of managing a home monitoring system of claim 14 wherein the central system in response to control commands transmits a message to the third parties.

16. The method of managing a home monitoring system of claim 14 wherein the central monitoring system in response to control commands sends a control command to the control apparatus to sound an alarm horn.

17. The method of managing a home monitoring system of claim 13 wherein the central system selectively commands the control apparatus to operate in plural modes including a normal mode wherein the captured video and a ping signal representing detected motion status is transmitted to the central system and a resource savings mode wherein the captured video is not transmitted to the central system and the ping signal representing detected motion status is transmitted to the central system.

* * * * *